(12) United States Patent
Minoshima

(10) Patent No.: US 9,277,197 B2
(45) Date of Patent: Mar. 1, 2016

(54) RECORDING APPARATUS, RECORDING METHOD, AND RECORDING SYSTEM

(71) Applicant: CANON KABUSHIKI KAISHA, Tokyo (JP)

(72) Inventor: Toshio Minoshima, Hiratsuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 162 days.

(21) Appl. No.: 13/758,460

(22) Filed: Feb. 4, 2013

(65) Prior Publication Data

US 2013/0202272 A1    Aug. 8, 2013

(30) Foreign Application Priority Data

Feb. 8, 2012    (JP) .................. 2012-025369

(51) Int. Cl.
| | |
|---|---|
| *H04N 5/92* | (2006.01) |
| *H04N 9/80* | (2006.01) |
| *H04N 5/77* | (2006.01) |
| *G11B 27/034* | (2006.01) |
| *H04N 5/765* | (2006.01) |
| *H04N 9/82* | (2006.01) |

(52) U.S. Cl.
CPC .............. *H04N 9/80* (2013.01); *G11B 27/034* (2013.01); *H04N 5/772* (2013.01); *H04N 5/765* (2013.01); *H04N 9/8205* (2013.01)

(58) Field of Classification Search
CPC .. G11B 27/105; G11B 27/034; H04N 9/8042; H04N 9/80; H04N 5/772
USPC ......................... 386/239, 278, 326
See application file for complete search history.

(56) References Cited

U.S. PATENT DOCUMENTS

| | | | |
|---|---|---|---|
| 8,373,700 B2* | 2/2013 | Terada et al. ................. | 345/428 |
| 2009/0109336 A1* | 4/2009 | Watanabe et al. ............. | 348/558 |
| 2009/0195842 A1* | 8/2009 | Sasaki ............................ | 358/474 |
| 2010/0277613 A1* | 11/2010 | Seki et al. .................. | 348/231.2 |

FOREIGN PATENT DOCUMENTS

| | | |
|---|---|---|
| JP | 2003-061041 | 2/2003 |
| JP | 2006-517756 A | 7/2006 |
| JP | 2008-172653 A | 7/2008 |

OTHER PUBLICATIONS

The above foreign patent documents were cited in the Sep. 1, 2015 Japanese Office Action, which is enclosed without an English Translation, that issued in Japanese Patent Application No. 2012025369.

* cited by examiner

*Primary Examiner* — Thai Tran
*Assistant Examiner* — Mishawn Hunter
(74) *Attorney, Agent, or Firm* — Cowan, Liebowitz & Latman, P.C.

(57) ABSTRACT

A recording apparatus of moving image data generates first moving image data and second moving image data having less number of pixels than the first moving image data, outputs the generated moving image data by using a plurality of output channels which conform with a predetermined format, determines the number of the second moving image data to be generated on the basis of an output state of the moving image data which is output by using the output channels in the case where the first moving image data is output in accordance with the predetermined format, and generates the second moving image data of the determined number in parallel with the outputting of the first moving image data.

8 Claims, 14 Drawing Sheets

| SD-SDI | HD-SDI | Dual Link SDI | 3G SDI |
|---|---|---|---|
| 270Mbps ONE COAXIAL CABLE | 1.485Gbps ONE COAXIAL CABLE | 2.970Gbps TWO COAXIAL CABLES | 2.970Gbps ONE COAXIAL CABLE |

FIG. 8

| OUTPUT SIGNAL | FRAME RATE | NUMBER OF CHANNELS | | | |
|---|---|---|---|---|---|
| | | SD-SDI | HD-SDI | Dual Link SDI | 3G SDI |
| 4K (4096×2160) | 59.94P | UNUSABLE | UNUSABLE | 4 | 2 |
| | 50.00P | UNUSABLE | UNUSABLE | 4 | 2 |
| | 29.97P | UNUSABLE | UNUSABLE | 2 | 1 |
| | 25.00P | UNUSABLE | UNUSABLE | 2 | 1 |
| | 24.00P | UNUSABLE | UNUSABLE | 2 | 1 |
| | 23.98P | UNUSABLE | UNUSABLE | 2 | 1 |
| HD (1920×1080) | 59.94P | UNUSABLE | 1 | 1 | 1 |
| | 50.00P | UNUSABLE | 1 | 1 | 1 |
| | 29.97P | UNUSABLE | 1 | 1 | 1 |
| | 25.00P | UNUSABLE | 1 | 1 | 1 |
| | 24.00P | UNUSABLE | 1 | 1 | 1 |
| | 23.98P | UNUSABLE | 1 | 1 | 1 |
| SD (720×480) | 59.94P | 1 | 1 | 1 | 1 |
| | 50.00P | 1 | 1 | 1 | 1 |
| | 29.97P | 1 | 1 | 1 | 1 |
| | 25.00P | 1 | 1 | 1 | 1 |
| | 24.00P | 1 | 1 | 1 | 1 |
| | 23.98P | 1 | 1 | 1 | 1 |

| OUTPUT CHANNEL | STATE 1 |
|---|---|
| CH1 | Dual Link SDI 4K |
| CH2 | |
| CH3 | |
| CH4 | |

902

| OUTPUT STATE | DOUBLE-SLOT RECORDING MODE | RELAY RECORDING MODE | NUMBER OF NECESSARY EDITING MOVING IMAGE | NUMBER OF EDITING MOVING IMAGES TO BE GENERATED |
|---|---|---|---|---|
| STATE 1 | OFF | ON | 1 | 1 |

| OUTPUT CHANNEL | STATE 2 | STATE 3 | STATE 4 | STATE 5 |
|---|---|---|---|---|
| CH1 | 3G SDI 4K | 3G SDI 4K | 3G SDI 4K | 3G SDI 4K |
| CH2 | | | | |
| CH3 | 3G SDI 4K | HD/SD SDI | HD/SD SDI | OFF |
| CH4 | | HD/SD SDI | OFF | OFF |

1002

| OUTPUT STATE | DOUBLE-SLOT RECORDING MODE | RELAY RECORDING MODE | NUMBER OF NECESSARY EDITING MOVING IMAGE | NUMBER OF EDITING MOVING IMAGES TO BE GENERATED |
|---|---|---|---|---|
| STATE 2 | ON | OFF | 2 | 2 |
| STATE 3 | RETAIN SETTING | RETAIN SETTING | 1 | 0 |
| STATE 4 | RETAIN SETTING | RETAIN SETTING | 1 | 0 |
| STATE 5 | OFF | ON | 1 | 1 |

FIG. 11

| FIG. 11A |
|----------|
| FIG. 11B |

| OUTPUT CHANNEL | STATE 6 | STATE 7 | STATE 8 | STATE 9 | STATE 10 | STATE 11 |
|---|---|---|---|---|---|---|
| CH1 | 3G SDI 4K | 3G SDI 4K | 3G SDI 4K | 3G SDI 4K | 3G SDI 4K | 3G SDI 4K |
| CH2 | 3G SDI 4K | 3G SDI 4K | 3G SDI 4K | 3G SDI 4K | 3G SDI 4K | 3G SDI 4K |
| CH3 | 3G SDI 4K | 3G SDI 4K | 3G SDI 4K | HD/SD SDI | HD/SD SDI | OFF |
| CH4 | 3G SDI 4K | HD/SD SDI | OFF | HD/SD SDI | OFF | OFF |

1102

| OUTPUT CHANNEL | STATE 12 | STATE 13 | STATE 14 | STATE 15 |
|---|---|---|---|---|
| CH1 | 3G SDI 4K | 3G SDI 4K | 3G SDI 4K | 3G SDI 4K |
| CH2 | HD/SD SDI | HD/SD SDI | HD/SD SDI | OFF |
| CH3 | HD/SD SDI | HD/SD SDI | OFF | OFF |
| CH4 | HD/SD SDI | OFF | OFF | OFF |

| OUTPUT STATE | DOUBLE-SLOT RECORDING MODE | RELAY RECORDING MODE | NUMBER OF NECESSARY EDITING MOVING IMAGE | NUMBER OF EDITING MOVING IMAGES TO BE GENERATED |
|---|---|---|---|---|
| STATE 6 | ON | OFF | 4 | 2 |
| STATE 7 | ON | OFF | 3 | 2 |
| STATE 8 | ON | OFF | 3 | 2 |
| STATE 9 | RETAIN SETTING | RETAIN SETTING | 2 | 0 |
| STATE 10 | OFF | ON | 2 | 1 |
| STATE 11 | ON | OFF | 2 | 2 |
| STATE 12 | RETAIN SETTING | RETAIN SETTING | 1 | 0 |
| STATE 13 | RETAIN SETTING | RETAIN SETTING | 1 | 0 |
| STATE 14 | RETAIN SETTING | RETAIN SETTING | 1 | 0 |
| STATE 15 | OFF | ON | 1 | 1 |

RECORDING APPARATUS, RECORDING METHOD, AND RECORDING SYSTEM

BACKGROUND OF THE INVENTION

1. Field of the Invention

The present invention relates to a recording apparatus of a moving image and, more particularly, to a recording apparatus, a recording method, and a recording system for recording a moving image and a moving image for editing that moving image data (hereinafter, referred to as "editing moving image").

2. Description of the Related Art

In the conventional arts, in the case of per generating an editing such as division, combination, and the like of a moving image, a method whereby an editing moving image having a smaller picture screen size than that of a moving image to be subjected to editing is prepared, an editing point is determined by using the editing moving image, and thereafter, the editing subject moving image is edited on the basis of the editing point (for example, refer to the Official Gazette of Japanese Patent Application Laid-Open No. 2003-61041). The editing moving image is also called "proxy".

In the case of generating the proxy, after such processings that an original moving image which is the editing subject is temporarily decoded, a picture screen size is reduced, and the like were executed, a compression and encoding processing is executed again. Therefore, it takes many hours to generate the proxy.

Further, although a method whereby the moving image is simultaneously recorded into a plurality of recording mediums and the recording mediums are edited by different editing systems is also considered, even in such a case, it is still necessary to generate the proxy in each editing system and a long time and much troublesomeness are also required.

SUMMARY OF THE INVENTION

It is an aspect of the invention to solve the foregoing problems and to enable an editing moving image to be promptly and efficiently generated and recorded.

According to the aspect of the invention, a recording apparatus of moving image data generates first moving image data and second moving image data having less number of pixels than that of the first moving image data, outputs moving image data generated by using a plurality of output channels which conform with a predetermined format to an outside, and in the case where the first moving image data is output in accordance with the predetermined format, determines the number of second moving image data to be generated, on the basis of an output state of the moving image data which is output by using the output channels, and generates and records into a recording medium the second moving image data of the determined number in parallel with the outputting of the first moving image data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a diagram illustrating relations among moving image data which is output from the recording apparatus according to the first embodiment of the invention, the SDI format, and the number of output channels.

FIG. 9 is a diagram illustrating a setting relation between the moving image data which is output from each channel of the recording apparatus according to the first embodiment of the invention and the moving image data to be generated.

FIG. 10 is a diagram illustrating a relation between the moving image data which is output from each channel of the recording apparatus according to the first embodiment of the invention and the moving image data to be generated.

FIG. 11 is comprised of FIGS. 11A and 11B showing diagrams illustrating a relation between the moving image data which is output from each channel of the recording apparatus according to the first embodiment of the invention and the moving image data to be generated.

DESCRIPTION OF THE EMBODIMENTS

Exemplary embodiments of the invention will be described hereinbelow with reference to the drawings.

First Embodiment

Figure 7A:
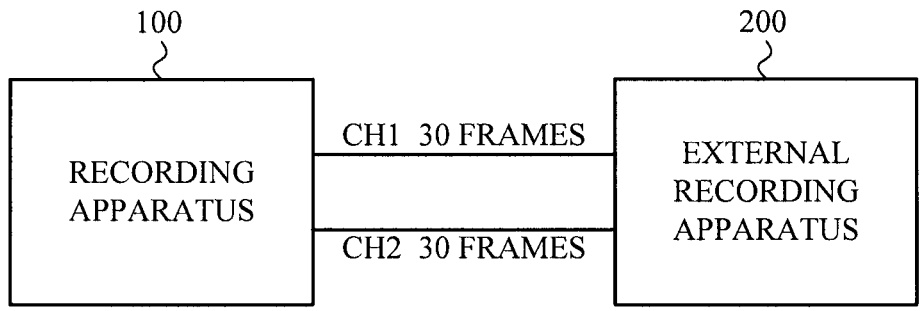
FIGS. 7A, 7B and 7C are diagrams each illustrating a connection construction of the recording apparatus and an external recording apparatus in the recording system according to the first embodiment of the invention.
Figure 7B:
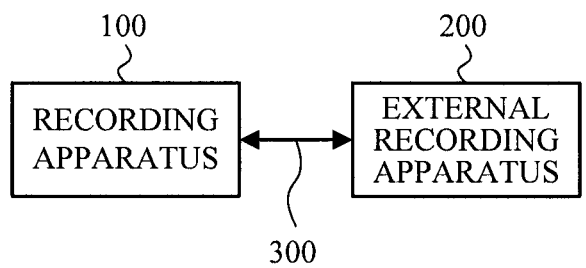
Figure 7C:
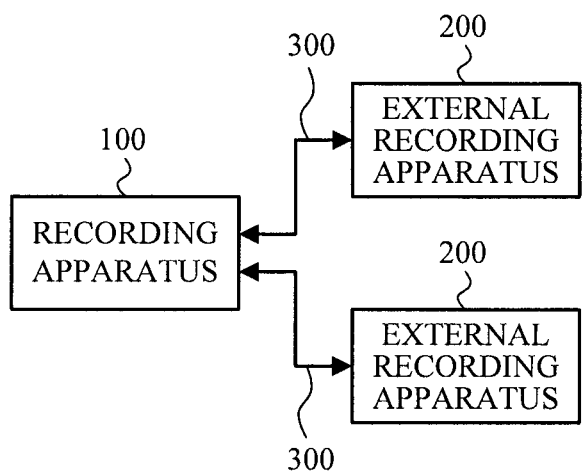

The embodiment is an embodiment in the case where the invention is applied to a recording system for recording moving image data into an external recording apparatus. The recording system may have such a construction as illustrated in FIGS. 7A to 7C. First, a construction of a recording apparatus for outputting the moving image data to the external recording apparatus will be described and, subsequently, a construction of the external recording apparatus will be described.

Figure 1:
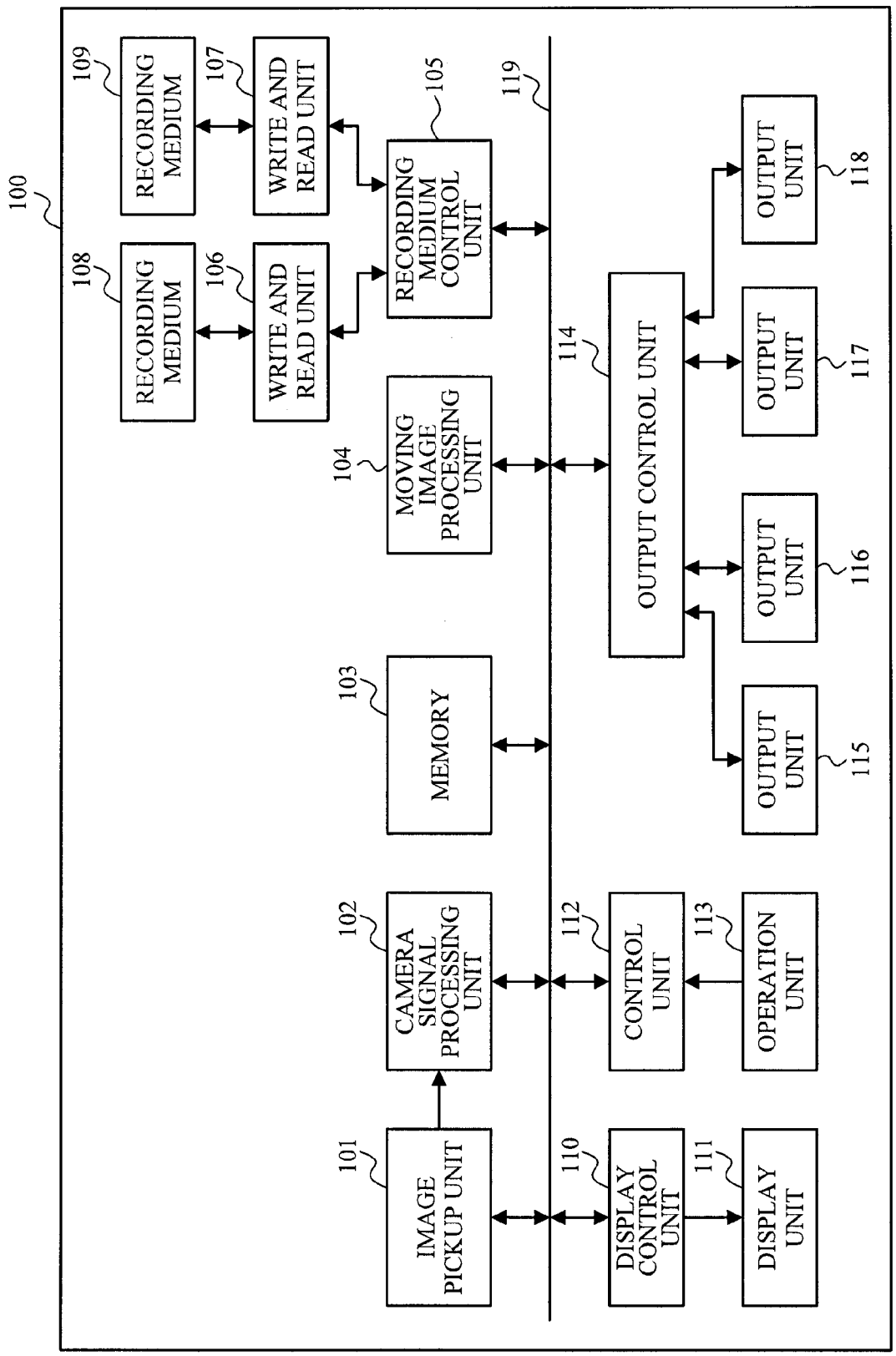
FIG. 1 is a block diagram illustrating a construction of an image pickup apparatus in the case where a recording apparatus according to the first embodiment of the invention is applied to the image pickup apparatus.

FIG. 1 is a block diagram illustrating an example of a construction of a recording apparatus 100 according to the embodiment. The recording apparatus can input and record moving image data from the outside as well as moving image data from an image pickup unit or a camera signal processing unit. Further, the recording apparatus is constructed in such a manner that the number of pixels of a moving image which is input and a frame rate can be also properly set.

In FIG. 1, an image pickup unit 101 has: an optical system such as lens, iris, shutter, and the like (not shown); and an image pickup element such as CCD, CMOS, or the like. The image pickup unit 101 photographs an object by them and outputs moving image data. The image pickup unit 101 obtains the moving image data and audio data to output them. In the embodiment, one picture plane of the image pickup element of the image pickup unit 101 is constructed by 4096 pixels (in the lateral direction)×2160 pixels (in the vertical direction) and the image pickup element can output a moving image of 60 frames per second. A camera signal processing unit 102 executes necessary processings to the moving image data from the image pickup unit 101. A memory 103 stores the moving image data and other data. Each block of the recording apparatus 100 accesses the memory 103, thereby executing the necessary processings. Besides the moving image data, the memory 103 stores various kinds of information such as information of a file system, management information such as user setting, and the like, and further plays a role of a work memory or the like for control by a control unit 112. The memory 103 also plays a role of a buffer memory upon recording or reproduction of data.

A moving image processing unit 104 converts the number of pixels of the moving image data which is input. Upon recording, the moving image processing unit 104 encodes the moving image data to be recorded by a well-known encoding method such as MPEG or the like and compresses an amount of information. As will be described hereinafter, in the case of outputting the moving image data to an external recording apparatus, the moving image processing unit 104 converts the moving image data in accordance with an output format which is set by the user. Upon reproduction, the moving image processing unit 104 decodes the reproduced moving image data.

A recording medium control unit 105 outputs a write instruction and a read instruction of data to write and read units 106 and 107, respectively. The recording medium control unit 105 outputs data to be recorded to the write and read units 106 and 107 and receives reproduced data from the write and read units 106 and 107. The recording medium control unit 105 receives and manages a result of detecting whether or not recording mediums 108 and 109 are loaded and in generate ation of a remaining amount of a recording capacity (remaining recording capacity) of each recording medium, and the like, by means of the write and read units 106 and 107.

The write and read units 106 and 107 write or read out the moving image data and various kinds of information into/from the recording mediums 108 and 109 and manage the recording mediums. For example, the information regarding the detection of loading of the recording medium and the remaining recording capacity of the loaded recording medium, and the like is obtained. Upon recording, the write and read units 106 and 107 record the moving image data into the recording mediums 108 and 109. Upon reproduction, the write and read units 106 and 107 read out the moving image data from the recording mediums 108 and 109 and send to the recording medium control unit 105. In the embodiment, the recording mediums 108 and 109 are constructed as independently separate recording mediums and are random access recording mediums such as hard disks (HDD), flash memory cards, or the like.

The recording medium control unit 105 manages the moving image data and the various kinds of information, as a file, which are recorded into the recording mediums 108 and 109 in accordance with a file system such as an FAT (File Allocation Table) or the like. The recording medium control unit 105 has a well-known interface (IF) such as an ATA (AT Attachment) or the like and communicates data and various kinds of commands with a recording medium IF in a control unit 112. The recording mediums 108 and 109 can be easily loaded and unloaded into/from the recording apparatus 100 by a loading and unloading mechanism (not shown). Both or one of the recording mediums 108 and 109 may be built in the recording apparatus 100. A display control unit 110 displays an image and other information to a display unit 111, for example, displays user setting information, information regarding the recording medium, information regarding the data which is being recorded, and the like. The display unit 111 includes a liquid crystal display apparatus, an organic EL apparatus, or the like.

The control unit 112 controls the whole operation of the recording apparatus 100 in accordance with an input from an operation unit 113. The control unit 112 includes a microcomputer (CPU), a memory, and the like and controls the recording apparatus 100 in accordance with a program (software) stored in a memory (not shown). The control unit 112 has therein a recording medium interface for communicating data and commands with the recording medium control unit 105. The operation unit 113 includes various kinds of switches which can be operated by the user, receives various kinds of instructions made by the user, and notifies the control unit 112 of them. The operation unit 113 also includes a power switch, switches for instructing the start and stop of the recording, a switch for switching operation modes such as a recording mode and the like of the recording apparatus 100, and the like.

In the case of writing and reading out a moving image file into/from the recording mediums 108 and 109, the control unit 112 controls the recording medium control unit 105 so as to read out file system data (management data) from the recording mediums 108 and 109 and store into the memory 103. The file system data is data showing file names of the data recorded in the recording mediums 108 and 109, sizes of the files, recording addresses of the data, and the like and is management information to manage the files. The control unit 112 controls writing and reading of the files in accordance with the read-out file system data. In accordance with the writing of the files into the recording mediums 108 and 109, the control unit 112 updates the file system data stored in the memory 103. The updated file system data is recorded into the recording mediums 108 and 109 by the recording medium control unit 105.

An output control unit 114 outputs the moving image data to the external recording apparatus by using output units 115 to 118 as a plurality of output channels (channels). The output control unit 114 converts the moving image data into a format suitable for a predetermined format and outputs to the output units 115 to 118. In the embodiment, the output units 115 to 118 output the moving image data in the format which conforms with the SDI (Serial Digital Interface) standard specified in SMPTE (the Society of Motion Picture and Television Engineers). Therefore, the output control unit 114 converts the moving image data into the moving image data in the format suitable for the SDI format and outputs. The output units 115 to 118 output the moving image data received from the output control unit 114, respectively. Each of the output units 115 to 118 has a connecting portion such as a BNC (Bayonet Neill Concelman) connector or the like. A data bus 119 is a transmission path for transmitting and receiving the data to/from each unit.

Subsequently, a recording processing in a normal mode in the recording apparatus 100 will be described. In the embodiment, as the number of pixels of one frame of the moving image data to be recorded, the user can select one of the following three kinds of numbers of pixels: 4096 pixels (in the lateral direction)×2160 pixels (in the vertical direction); 1920 pixels (in the lateral direction)×1080 pixels (in the vertical direction); and 720 pixels (in the lateral direction)×480 pixels (in the vertical direction). In the embodiment, the moving image in which the number of pixels of one frame is equal to 4096 pixels (in the lateral direction)×2160 pixels (in the vertical direction) is called 4K; the moving image of 1920 pixels (in the lateral direction)×1080 pixels (in the vertical direction) is called HD; and the moving image of 720 pixels (in the lateral direction)×480 pixels (in the vertical direction) is called SD. As a frame rate (the number of frames per unit time) of the moving image data to be recorded, the user can set one of 59.94 frames/sec (fps), 50 fps, 29.97 fps, 25 fps, 24 fps, and 23.98 fps. By operating the operation unit 113, the user selects the number of pixels of the moving image to be recorded and the frame rate. The number of pixels of the moving image data and the frame rate may be also set to other values.

When a power source is turned on by the operation unit 113, the control unit 112 controls each unit, displays the moving image photographed by the image pickup unit 101 to the display unit 111, and sets the recording apparatus 100 into a recording standby state. When there is a recording start instruction from the operation unit 113 in this recording standby state, the control unit 112 instructs the image pickup unit 101 and the camera signal processing unit 102 so as to output the moving image data of the designated frame rate. The camera signal processing unit 102 outputs the moving image data of 4K of the designated frame rate and stores into the memory 103. The moving image processing unit 104 reads out the moving image data of 4K stored in the memory 103 and converts the number of pixels of the moving image data into the number of pixels designated by the user. The moving image processing unit 104 encodes the converted moving image data and stores into the memory 103.

The control unit 112 instructs the recording medium control unit 105 so as to start the recording of the moving image. The recording medium control unit 105 reads out the moving image data from the memory 103 and outputs to one of the write and read units 106 and 107 so as to be recorded into one of the recording mediums 108 and 109. In the embodiment, by operating the operation unit 113, the user selects one of the recording mediums 108 and 109 and the moving image data is recorded into the selected recording medium. If only one of the recording mediums 108 and 109 is loaded, the control unit 112 instructs the recording medium control unit 105 so as to record the moving image data into the loaded recording medium irrespective of the setting by the user.

In accordance with an instruction from the control unit 112, the recording medium control unit 105 outputs the moving image data which is read out of the memory 103 to one of the write and read units 106 and 107 and instructs so as to write it. One of the instructed write and read units 106 and 107 records the received moving image data into one of the recording mediums 108 and 109. After the recording is started, when there is a recording stop instruction from the operation unit 113, the control unit 112 instructs the recording medium control unit 105 so as to stop the recording, thereby stopping the recording of the moving image data into the recording mediums 108 and 109. The control unit 112 instructs the moving image processing unit 104 so as to stop the conversion of the number of pixels and the encoding processing.

Subsequently, a relay recording will be described. In the embodiment, the apparatus has such a function that when the remaining recording capacity becomes empty during the recording of the moving image data into one of the recording mediums, even if the user does not instruct a change of the recording medium, the moving image data is continuously recorded into the other recording medium. Such a function is referred to as "relay recording function".

In the embodiment, if both of the recording mediums 108 and 109 are loaded, the control unit 112 controls the recording apparatus 100 so as to perform the relay recording in accordance with an instruction of the user. By operating the operation unit 113, the user can set whether or not the relay recording is performed. If the relay recording is set, after the recording of the moving image is started as mentioned above, the control unit 112 receives information showing the remaining recording capacity of the recording medium in which the moving image data is being recorded from the recording medium control unit 105. When the remaining recording capacity is smaller than a predetermined threshold value, the control unit 112 instructs the recording medium control unit 105 to stop the recording into the recording medium in which the data is being currently recorded and to start the recording into the other recording medium. For example, while the moving image data is being recorded into the recording medium 108, the recording medium control unit 105 instructs the write and read unit 106 to stop the recording by an instruction from the control unit 112 and instructs the write and read unit 107 to start the recording. The write and read unit 106 stops the recording of the moving image data into the recording medium 108, in accordance with the recording stop instruction. The write and read unit 107 starts the recording of the moving image data into the recording medium 109, in accordance with the recording start instruction. After that, if the recording stop instruction is issued from the operation unit 113, the control unit 112 instructs the recording medium control unit 105 so as to stop the recording, thereby stopping the recording of the moving image data into the recording medium 109.

Subsequently, a simultaneous recording will be described. The recording apparatus according to the embodiment has a function for simultaneously recording the same moving image data into the two recording mediums 108 and 109. Such a function is referred to as "simultaneous recording function".

In the embodiment, if both of the recording mediums 108 and 109 are loaded, by operating the operation unit 113, the user can set the simultaneous recording. If the simultaneous recording is set, the control unit 112 instructs the recording medium control unit 105 so as to record the moving image data into both of the recording mediums 108 and 109 in accordance with the recording start instruction. The recording medium control unit 105 outputs the moving image data to both of the write and read units 106 and 107 and instructs the recording start thereto. The write and read units 106 and 107 start the recording of the moving image data into the recording mediums 108 and 109. After the recording is started, if the recording stop instruction is issued from the operation unit 113, the control unit 112 instructs the recording medium control unit 105 so as to stop the recording. The recording medium control unit 105 instructs the write and read units 106 and 107 so as to stop the recording of the moving image data into the recording mediums 108 and 109 in accordance with the recording stop instruction. The write and read units 106 and 107 stop recording into the recording mediums 108 and 109 in accordance with the recording stop instruction.

Subsequently, an external recording mode will be described. In the embodiment, in an external output mode, the photographed moving image data is output to the external recording apparatus from the four output units 115 to 118. By instructing the external recording apparatus to start and stop the recording in accordance with the recording start and stop instructions by the user, the moving image data which is output is recorded by the external recording apparatus. By operating the operation unit 113, the user can set the external output mode. Even when the external output mode is set, the user can set the number of pixels and the frame rate of the moving image data which is output, as mentioned above.

Figures 5, 6:
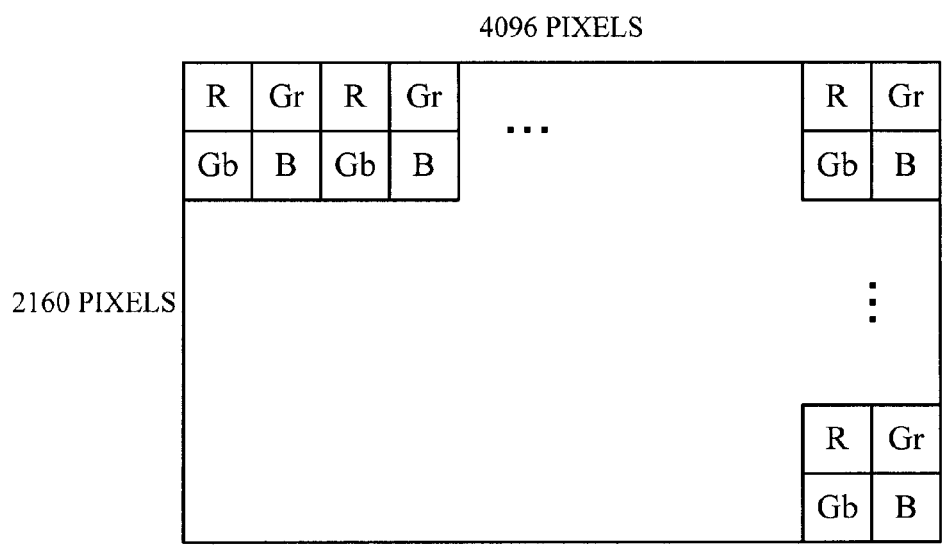
FIG. 5 is a diagram showing a bit rate in an SDI (Serial Digital Interface) format.
FIG. 6 is a diagram illustrating a pixel array of moving image data which is processed by the recording apparatus according to the first embodiment of the invention.

The output units 115 to 118 output the moving image data in accordance with the SDI standard. FIG. 5 shows relations among a type of SDI, a maximum transmission bit rate, and the number of using cables which are specified in the SMPTE or ITU-R (International Telecommunication Union Radio communications Sector). In the SD-SDI, a transmission bit rate is equal to 270 Megabits/sec (Mbps). In the HD-SDI, a transmission bit rate is equal to 1.485 Gigabits/sec (Gbps). In the DualLinkSDI and 3GSDI, a transmission bit rate is equal to 2.970 Gbps.

FIG. 6 illustrates a pixel array of the moving image data of 4K which is output in the external output mode. In the embodiment, the pixel array of the moving image data of 4K is set to a Bayer array which has widely been used in the image pickup apparatus in the conventional art. In the Bayer array, two lines of a line in which R (red) and Gr (green) are alternately arranged and a line in which Gb (green) and B (blue) are alternately arranged are alternately arranged in the vertical direction. Each pixel is output as data of 10 bits. Therefore, a data amount per frame is equal to 88.47 Megabits (=4096×2160 pixels×10 bits).

When a frame rate of the moving image data of 4K is equal to 59.94 fps, a bit rate of the moving image data which is output is equal to 5.303 Gbps (Gigabits) (=88.47 Mbits× 59.94) (>2.970 Gbps). Therefore, in the case of outputting the moving image data by 3GSDI, it is necessary to divide the moving image data into two channels to output. In the case of outputting the moving image data by DualLinkSDI, it is necessary to divide the moving image data into four channels to output.

When the frame rate of the moving image data of 4K which is output is equal to 29.97 fps, the bit rate of the moving image data which is output is equal to 2.651 Gbps (=88.47 Mbits× 29.97). Therefore, in the case of outputting the moving image data by 3GSDI, the data can be output by one channel. In the case of outputting the moving image data by DualLinkSDI, it is necessary to divide the moving image data into two channels to output.

In the embodiment, in the case of dividing the moving image data of 4K into two channels and outputting, the moving image data is alternately allocated to each channel every frame and is output. Therefore, the moving image data which is output by each channel is output as moving image data in which the number of frames of the original moving image data is reduced into ½. The moving image data which is divided into two channels and been output as mentioned above is received by, for example, the external recording apparatus in FIG. 2 and can be recorded as one moving image data. FIG. 7A illustrates a construction of a recording system which divides the moving image of 4K and 59.94 fps into two channels (CH1, CH2) and outputs from the recording apparatus 100 to an external recording apparatus 200.

In the case of dividing the moving image data of 4K into four channels and outputting, the moving image data is sequentially allocated to each channel every frame and is output. Therefore, the moving image data which is output by each channel is output as moving image data in which the number of frames of the original moving image data is reduced into ¼. The moving image data which is divided into four channels and been output as mentioned above is received by the external recording apparatus and can be recorded as one moving image data.

FIG. 8 shows a relation between the moving image data which is output and the number of channels which are used to output each moving image data. As mentioned above, by operating the operation unit 113, the user can set the number of pixels of the moving image data which is output and the frame rate. By operating the operation unit 113, the user can also set the type (the number of pixels and the frame rate) of moving image data which is output and the type of SDI which is used to output the moving image data every output channel (channel CH). By operating the operation unit 113, the user can also set whether or not the moving image data is output every channel. The output units 115 to 118 in FIG. 1 correspond to channels 1 to 4 (CH1 to CH4). In order to output the moving image of 4K and 59.94 fps by 3GSDI, two channels of SDI are necessary. Therefore, for example, in the embodiment, in the case where the user has set CH1 into 3GSDI and has set the moving image data which is output into 4K and 59.94 fps, CH2 is also automatically set into 3GSDI and the moving image data which is output is set into 4K and 59.94 fps.

In the embodiment, when the moving image data is output to the outside in the external output mode, moving image data for editing (proxy data) can be also simultaneously generated and recorded into the recording mediums 108 and 109. In the embodiment, the moving image data of HD or SD is generated as the moving image data for editing. The moving image data having less number of pixels than the moving image data of SD can be generated and recorded as the moving image data for editing. In the case where the moving image data of 4K is output to the outside, moving image data of HD or SD corresponding to the moving image data which is being output is generated and recorded into the recording mediums 108 and 109 in parallel with the outputting of the moving image data. In the external output mode, the number of necessary editing moving image data is determined in accordance with the number of channels which are used to output the moving image data and the type of moving image data which is output from each channel. That is, the number of editing moving image data to be generated is determined. In the embodiment, the moving image data of HD is recorded as editing moving image data. It is also possible to construct in such a manner that the user can select which one of the moving image data of HD and SD is recorded. In the embodiment, in the external output mode, the moving image data of 4K is output without being encoded by MPEG.

Figure 3:
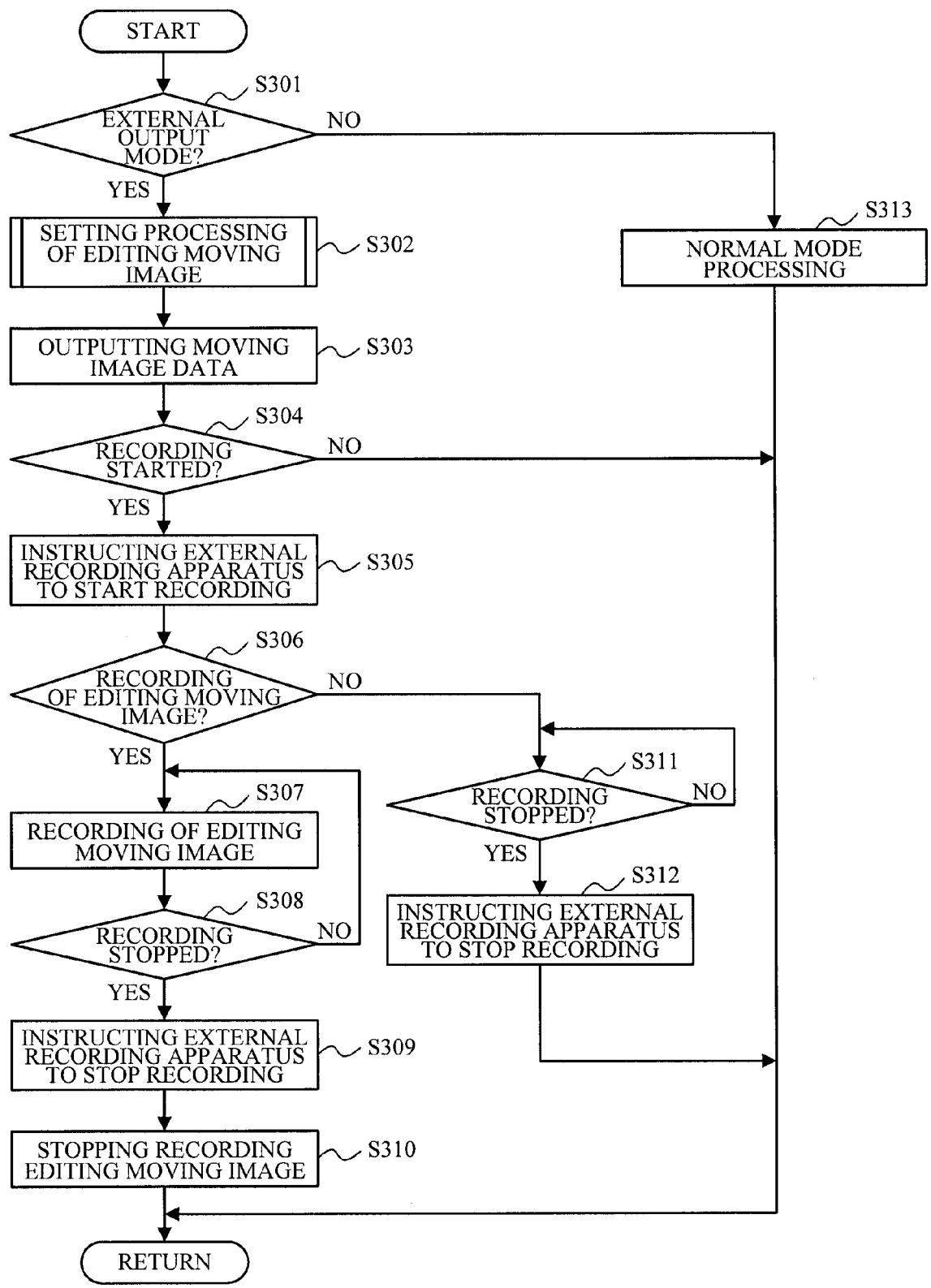
FIG. 3 is a flowchart for the operation of the recording apparatus according to the first embodiment of the invention.
Figures 4, 4A, 4B:
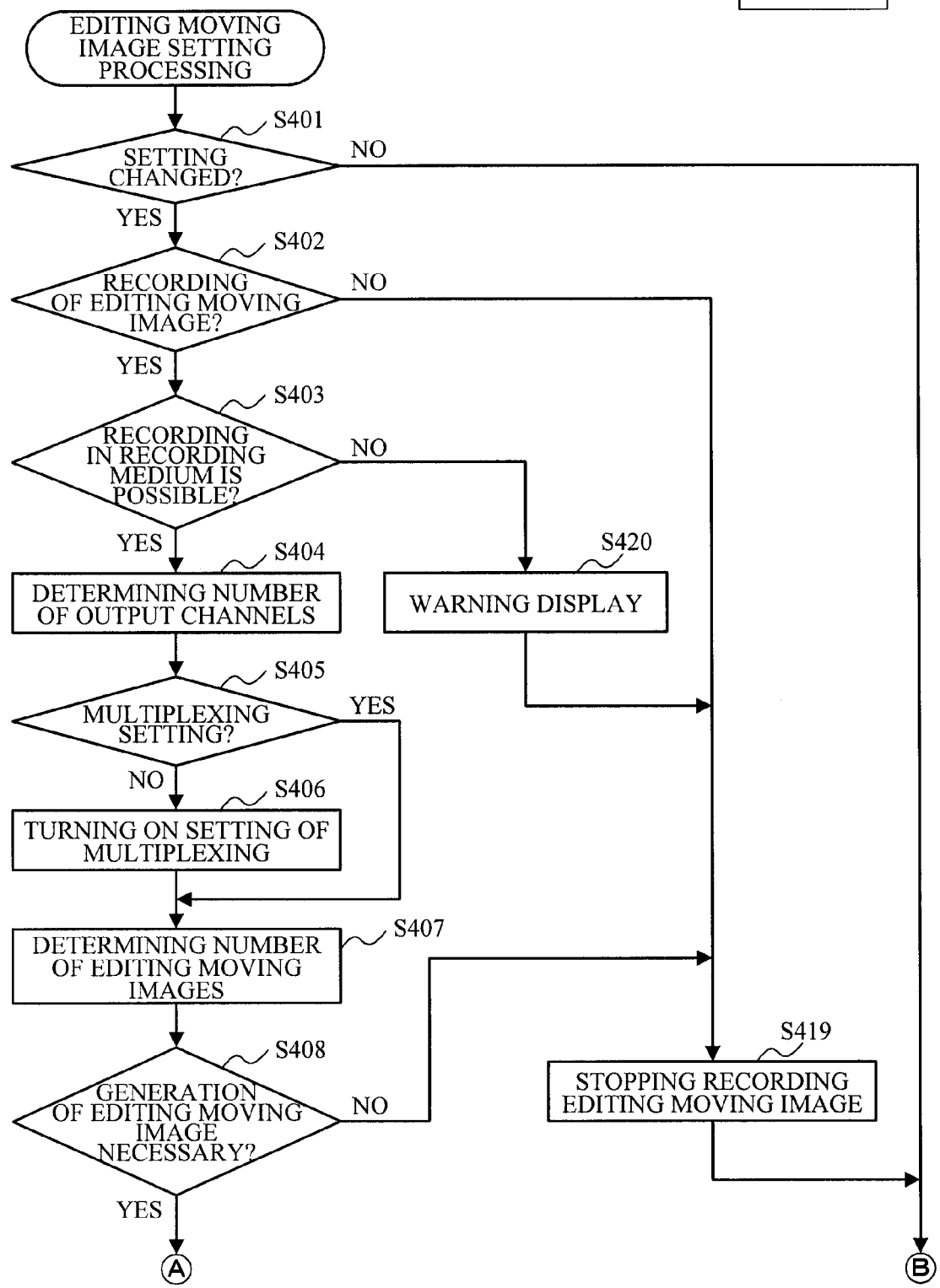
FIG. 4 is comprised of FIGS. 4A and 4B showing flowcharts showing a setting processing of an editing moving image in the recording operation in FIG. 3.
Figure 4B:
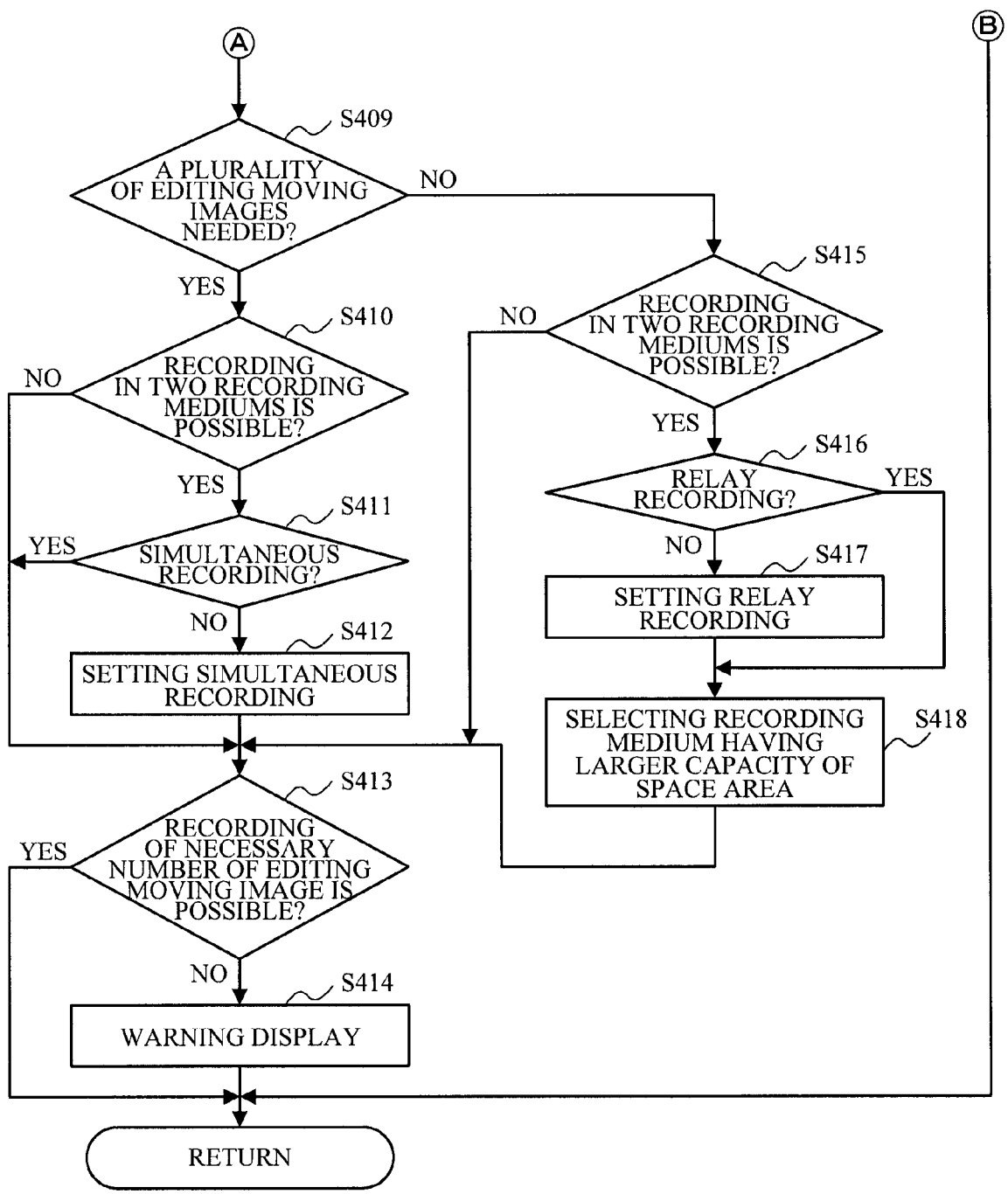

FIGS. 3 and 4 show flowcharts for the operation of the recording apparatus 100 associated with the external output mode. The processings in FIGS. 3 and 4 are executed by a method whereby the control unit 112 controls each unit of the recording apparatus 100. The processings in FIGS. 3 and 4 are also repetitively executed in an ON state of a power source of the recording apparatus 100.

In a recording standby state, the control unit 112 discriminates whether or not the system is set into the external output mode (S301). If the external output mode is not set, the control unit 112 executes a recording processing in the normal mode as mentioned above (S313). If the external output mode is set, the control unit 112 executes a setting processing of the editing moving image data (S302).

FIG. 4 is a flowchart showing a setting processing of the editing moving image data in the external output mode S302. The control unit 112 discriminates whether or not settings such as type of moving image data to be output, output channels, and the like are changed (S401). As mentioned above, by operating the operation unit 113, the user can set the number of pixels and a frame rate of the moving image data which is output from the output units 115 to 118 and the SDI format in the output units 115 to 118. The control unit 112 discriminates whether or not those settings are changed by the user. If the settings are changed, the control unit 112 confirms whether or not a mode for recording the editing moving image data in parallel with the outputting of the moving image data (S402). By operating the operation unit 113, the user can set whether or not the editing moving image data is recorded at the time of outputting the moving image data in the external output mode. If the mode for recording the editing moving image data is not set, the control unit 112 sets so as to stop the recording of the editing moving image data (S419).

If the mode for recording the editing moving image data is set, the control unit 112 obtains a detection result about whether or not the recording mediums 108 and 109 are loaded and the information of the remaining recording capacity of each recording medium from the recording medium control unit 105. On the basis of those information, whether or not the editing moving image data can be recorded into each of the recording mediums is discriminated (S403). If none of the recording mediums is loaded or if the remaining recording capacity of each recording medium is empty, the control unit 112 determines that the editing moving image data cannot be recorded, and displays a warning to the display unit 111 (S420). The control unit 112 makes settings so as to stop the recording of the editing moving image data (S419).

If the editing moving image data can be recorded into at least one of the recording mediums, the control unit 112 obtains the number of pixels and the frame rate of the moving image data which is output, and the information of the setting state of the SDI for the output units 115 to 118. On the basis of those information, the control unit 112 determines the number of channels which are used to output the moving image data (S404). For example, as illustrated in FIG. 8, if the moving image data is 4K and 59.94 fps and the setting of the SDI is 3GSDI, the control unit 112 determines that the number of channels which are used to output the moving image data is equal to 2.

Subsequently, the control unit 112 discriminates whether or not the multiplex setting of the data is effective to the moving image data to be output (S405). In the embodiment, the command data for instructing the recording start and stop can be multiplexed to the moving image data to be output in the external output mode and the obtained moving image data can be output. By operating the operation unit 113, the user can set whether or not the command data is multiplexed. If the multiplex setting of the command data is not set by the user, the control unit 112 turns on the setting for multiplexing the command data and displays the information showing that the multiplex setting is turned on onto the display unit 111 (S406). The information of the output state of the moving image data which is set by the user and the control unit 112 can be also multiplexed and such a mode can be set by the operation unit 113 or displayed onto the display unit 111.

Subsequently, on the basis of the number of pixels and the frame rate of the moving image data which is output and the information of the setting state of the SDI for the output units 115 to 118, the control unit 112 determines the number of editing moving image data to be generated in response to the recording instruction to the external recording apparatus (S407). In the embodiment, it is assumed that when the moving image data of HD or SD is output, the editing moving image data is not generated. However, since the moving image data of SD may be also generated as editing moving image data when the moving image data of HD is output, an arrangement may be also configured according to such a setting and processing construction.

FIGS. 9 to 12 illustrate the number of editing moving image data corresponding to the moving image data which is output by each channel, and the setting state of the SDI which is set into each channel, in the case of outputting the moving image data of 4K in the external output mode.

Reference numeral 901 in FIG. 9 denotes a table showing a state 1 where the moving image of 4K is output by using all of the four channels. For example, it corresponds to a case where the setting of SDI is DualLinkSDI and the moving image data is 4K and 60 fps. In this case, as shown at a table 902, the number of necessary editing moving image data for the moving image of 4K which is output is equal to 1 and the number of editing moving image data which is generated and recorded by the recording apparatus 100 is equal to 1.

Reference numeral 1001 in FIG. 10 denotes a table of states 2 to 5 where the moving image of 4K is output by using two channels. For example, in the state 4, the moving image of 4K is output by using the channels 1 and 2. Since the channel 3 is set into HD-SDI or SD-SDI, it is determined that the moving image data of HD or SD which is output from the channel 3 is the editing moving image data. In this case, as shown in a table 1002, although the number of necessary editing moving image data for the moving image of 4K which is output is equal to 1, there is no need to generate the editing moving image data in the recording apparatus 100. Therefore, in the construction of the embodiment, the control unit 112 makes settings so as not to generate and record the editing moving image data.

Reference numeral 1101 and 1102 in FIG. 11 denote tables of states 6 to 15 where the moving image of 4K is output by using one channel. For example, in the state 14, the moving image of 4K is output by using the channel 1. Since the channel 2 is set into HD-SDI/SD-SDI, it is determined that the moving image data of HD or SD which is output from the channel 2 is the editing moving image data. In this case, as shown at 1103, although the number of necessary editing moving image data for the moving image of 4K which is output is equal to 1, there is no need to generate the editing moving image data in the recording apparatus 100. In FIGS. 10 and 11, if a combination of the type of moving image which is output from one channel and the setting state of the SDI is not changed, a combination of the channels 1 to 4 and the setting states of the moving image data and the SDI may be changed. For example, in the state 14, the moving image data of 4K and 3GSDI can be set into the channel 3 and the moving image data of HD or SD and HD-SDI/SD-SDI may be also set into the channel 4. In the tables 1002 and 1103, when the notation "retain settings" indicates that the system operates in accordance with the setting states made by the user.

After the number of editing moving image data to be generated is determined, the control unit 112 discriminates whether or not it is necessary to generate the editing moving image data (S408). If there is no need to generate the editing moving image data, that is, if the number of editing moving image data to be generated in FIGS. 10 and 11 is equal to 0, the control unit 112 makes settings so as to stop the recording of the editing moving image data (S419). In the case of generating the editing moving image data, the control unit 112 discriminates whether or not it is necessary to generate a plurality of editing moving image data (S409).

If it is necessary to generate a plurality of editing moving image data, the control unit 112 discriminates whether or not the moving image data can be recorded into the two recording mediums 108 and 109 (S410). If the moving image data can be recorded into the two recording mediums 108 and 109, the control unit 112 discriminates whether or not the simultaneous recording is set (S411). If the simultaneous recording is not set, the control unit 112 effectively sets the simultaneous recording and, further, displays a message showing that the simultaneous recording is set onto the display unit 111 (S412).

If a plurality of editing moving image data is not generated in S409, the control unit 112 discriminates whether or not the moving image data can be recorded into the two recording mediums 108 and 109 (S415). If the moving image data can be recorded into the two recording mediums 108 and 109, the control unit 112 discriminates whether or not the relay recording is set (S416). If the relay recording is not set, the control unit 112 sets the relay recording so as to be effective and, further, displays a message showing that the relay recording is set onto the display unit 111 (S417). The control unit 112 selects the recording medium having a larger remaining recording capacity between the two recording mediums as a recording destination of the editing moving image data (S418).

Subsequently, the control unit 112 discriminates whether or not the editing moving image data of the necessary number can be recorded (S413). If the editing moving image data of the necessary number cannot be recorded, the control unit 112 displays a warning onto the display unit 111 (S414). For example, if the moving image data cannot be recorded into the two recording mediums, the control unit 112 records the editing moving image data into one of the recording mediums and displays a message indicating that the editing moving image data is shorter than the moving image data of 4K which is recorded into the external recording apparatus, onto the display unit 111. In the state 6 in FIG. 10, the moving image of 4K is output from each of the channels 1 to 4. Therefore, the number of editing moving image data corresponding to each moving image is equal to 4. However, since the recording apparatus 100 can simultaneously record the editing moving image data into the two recording mediums 108 and 109, the maximum number of editing moving image data which can be recorded by the recording apparatus 100 is equal to 2. In the case where the number of editing moving image data which can be recorded by the recording apparatus 100 is smaller than the number of necessary editing moving image data, the control unit 112 displays information indicating that the number of editing moving image data is smaller onto the display unit 111.

Figure 12:
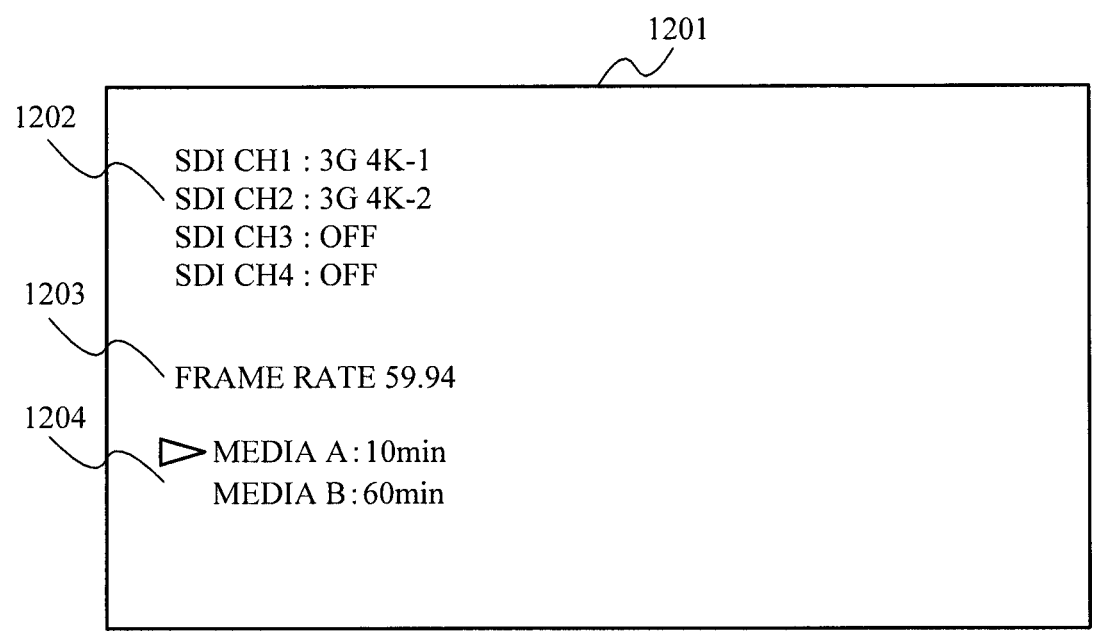
FIG. 12 is a diagram illustrating a display screen in the case where an external output mode is set in the recording apparatus according to the first embodiment of the invention.

The control unit 112 displays onto the display unit 111 information indicating that the number of pixels and the frame rate of the moving image data which is output from each output unit in the case where the external output mode is set, and the setting of the SDI for each channel. FIG. 12 is a diagram illustrating an example of a display screen in the external output mode. A display screen 1201 illustrates, for example, a state of the display screen in the state 5 in FIG. 10. Reference numeral 1202 denotes a format of the SDI set in each channel and information of the number of pixels of the moving image which is output. Reference numeral 1203 denotes a frame rate and 1204 indicates information of the recording medium.

When the setting processing of the editing moving image data is finished as mentioned above, the control unit 112 instructs the moving image processing unit 104 to generate the moving image data corresponding to the settings made by the user. For example, if the state 4 in FIG. 10 is set, the moving image processing unit 104 generates the moving image data of 4K of the designated frame rate and the moving image data of HD or SD. The output control unit 114 outputs each of the moving image data from the corresponding channel in accordance with the settings (S303). Subsequently, the control unit 112 discriminates whether or not the recording start instruction is issued from the operation unit 113 (S304). If the recording start instruction is issued, the control unit 112 instructs the output control unit 114 to multiplex command data for instructing the start of the recording to the moving image data which is output from the output units 115 to 118 (S305). The output control unit 114 multiplexes the command data for the recording start to the moving image data which is output and outputs the obtained moving image data to each of the output units 115 to 118.

Figure 13:
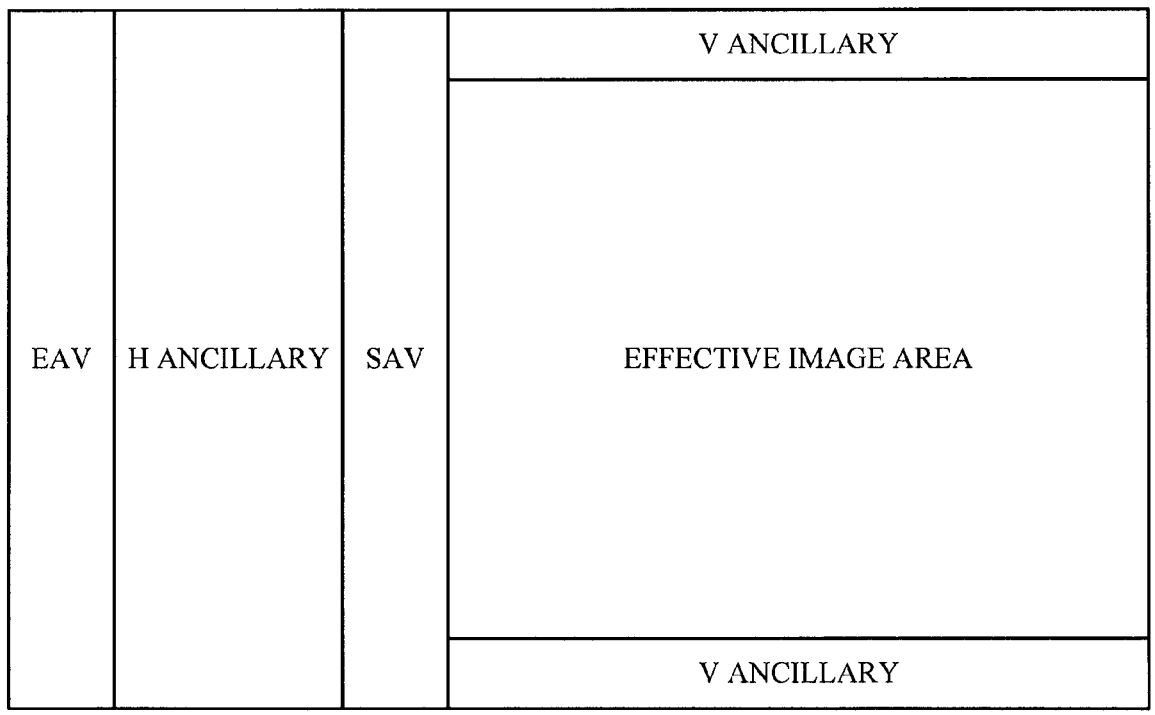
FIG. 13 is a diagram illustrating a construction of the moving image data which is output in the recording apparatus according to the first embodiment of the invention.

FIG. 13 is a diagram illustrating a construction of the moving image data which is output from the output units 115 to 118 in the embodiment. In the embodiment, the moving image data is output in accordance with the SDI standard. FIG. 13 shows the moving image data of one frame. The moving image data of one frame is constructed by: an EAV showing an end of a horizontal line; an H ancillary serving as ancillary data; an SAV showing a start of the horizontal line; a V ancillary serving as ancillary data; and an effective image area. In the embodiment, the recording start command data and the recording stop command data are multiplexed to a predetermined horizontal line in the V ancillary and the obtained moving image data is output. Information of an output state of the moving image data set by the user and the control unit 112 can be also similarly multiplexed.

The control unit 112 discriminates whether or not the mode for recording the editing moving image data is set (S306). If not recording the editing moving image data, the control unit 112 discriminates whether or not the recording stop instruction is issued from the operation unit 113 (S311). If the recording stop instruction is not issued, the moving image data is output as it is. If the recording stop instruction is issued, the control unit 112 instructs the output control unit 114 so as to multiplex the command data for instructing the recording stop to the moving image data which is output from the output units 115 to 118 (S312). The output control unit 114 multiplexes the recording stop command data to the moving image data which is output and outputs the obtained moving image data to the output units 115 to 118.

If the mode for recording the editing moving image data is set in S306, the control unit 112 controls the moving image processing unit 104 so as to generate the editing moving image data of the number which is set by the processing in FIG. 4. The control unit 112 instructs the recording medium control unit 105 to record the editing moving image data (S307). The recording medium control unit 105 instructs the write and read units 106 and 107 to record the editing moving image data into the recording medium designated by the control unit 112. At this time, if the editing moving image data is recorded into both of the recording mediums 108 and 109, the recording medium control unit 105 instructs the write and read units 106 and 107 to record the editing moving image data into the two recording mediums 108 and 109 in a manner similar to the simultaneous recording processing mentioned above.

In the case where the editing moving image data is recorded into one of the two recording mediums 108 and 109 and, further, the relay recording is set, the recording medium control unit 105 executes the relay recording processing mentioned above. That is, when the remaining recording capacity of one of the recording mediums is empty, the recording medium control unit 105 selects the other recording medium and continues the recording of the editing moving image data.

After the recording of the editing moving image data is started, the control unit 112 discriminates whether or not the recording stop instruction is issued (S308). If the recording stop instruction is issued, the control unit 112 instructs the output control unit 114 so as to multiplex the command data for instructing the recording stop to the moving image data which is output from the output units 115 to 118 (S309). The output control unit 114 multiplexes the recording stop command data to the moving image data which is output and outputs the obtained moving image data to the output units 115 to 118. Subsequently, the control unit 112 instructs the recording medium control unit 105 to stop the recording of the editing moving image data (S310). The recording medium control unit 105 instructs the write and read units 106 and 107 to stop the recording of the editing moving image data.

Figure 2:
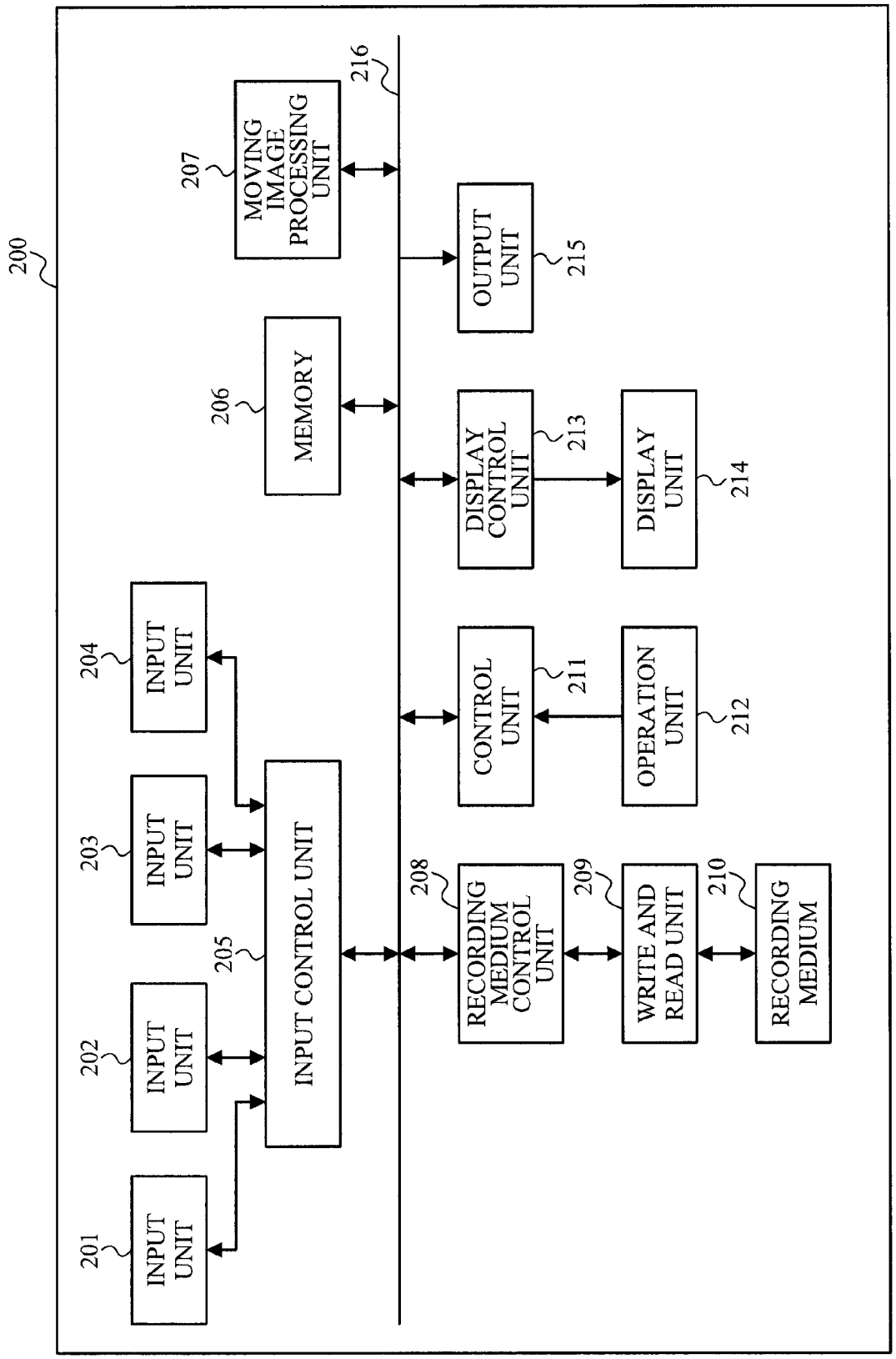
FIG. 2 is a block diagram illustrating a construction of an external recording apparatus constructing the recording apparatus in FIG. 1 and a recording system.

Subsequently, the external recording apparatus for receiving the moving image data which is output from the recording apparatus 100 and recording will be described. FIG. 2 is a block diagram illustrating a construction of the external recording apparatus 200. In the embodiment, as illustrated in FIG. 7B or 7C, by connecting the recording apparatus 100 and the external recording apparatus 200 by a cable 300 corresponding to the SDI, the moving image data is output from the recording apparatus 100 to the external recording apparatus 200. FIG. 7C illustrates a state where the two recording apparatuses 200 are connected to the recording apparatus 100.

In FIG. 2, input units 201 to 204 are a plurality of input channels (channels) and input the moving image data which is output from the recording apparatus 100 in accordance with the SDI format, respectively. On the basis of the SDI format of each input unit which is set by a control unit 211 and a type of moving image data, an input control unit 205 receives the moving image data which is input and outputs to a memory 206.

The memory 206 stores the moving image data and other data. Each block of the external recording apparatus 200 executes necessary processings by accessing the memory 206. Besides the moving image data, the memory 206 also stores various kinds of information such as information of the file system, management information, and the like. Further, the memory 206 plays a role of a work memory or the like for control by the control unit 112. The memory 206 also plays a role of a buffer memory at the time of recording and reproduction of data.

A moving image processing unit 207 converts the number of pixels of the moving image data. When the recorded moving image data is encoded, the moving image processing unit 207 decodes the reproduced moving image data. In the case of outputting the reproduced moving image data, the moving image processing unit 207 converts the moving image data in accordance with an output generate at which is set by the user.

A recording medium control unit 208 outputs a write instruction and a read instruction of data to a write and read unit 209. The recording medium control unit 208 outputs data to be recorded to the write and read unit 209 and receives reproduced data from the write and read unit 209. The recording medium control unit 208 receives information of a remaining recording capacity of a recording medium 210 and the like from the write and read unit 209.

The write and read unit 209 writes and reads out the moving image data and various kinds of information into/from the recording medium 210. Upon recording, the write and read unit 209 records the moving image data into the recording medium 210. Upon reproduction, the write and read unit 209 reads out the moving image data from the recording medium 210 and transmits to the recording medium control unit 208. In the embodiment, the recording medium 210 is a random access recording medium such as hard disk (HDD) built in the recording apparatus 200, flash memory card, or the like. The recording medium 210 may be constructed in such a manner that the recording mediums 108 and 109 can be easily loaded and unloaded into/from the recording apparatus 100 by a loading and unloading mechanism (not shown).

The recording medium control unit 208 manages the moving image data and various kinds of information which are recorded into the recording medium 210 as files in accordance with a file system such as an FAT (File Allocation Table) or the like. The recording medium control unit 105 has a well-known interface (IF) such as an ATA (AT Attachment) or the like and communicates data and various kinds of commands with a recording medium IF in the control unit 211.

The control unit 211 controls the whole operation of the recording apparatus 200 in accordance with an input from an operation unit 212. The control unit 211 includes a microcomputer, a memory, or the like and controls the recording apparatus 200 in accordance with a program stored in the memory (not shown). The control unit 211 also includes a recording medium interface for communicating data and commands with the recording medium control unit 208. The operation unit 212 includes various kinds of switches which can be operated by the user. The operation unit 212 receives various kinds of instructions or the like which are made by the user and notifies the control unit 211 of them. The control unit 211 also includes a power switch, switches for instructing the start and stop of the recording, a switch for switching modes of the recording apparatus 200, and the like.

In the case of writing and reading out a moving image file into/from the recording medium 210, the control unit 211 controls the recording medium control unit 208 so as to read out file system data (management data) from the recording medium 210 and store into the memory 206. The file system data is data showing file names of the data recorded in the recording medium 210, sizes of the files, recording addresses of the data, and the like and is management information to manage the files. The control unit 211 controls writing and reading of the files in accordance with the read-out file system data. In accordance with the writing of the files into the recording medium 210, the control unit 211 updates the file system data stored in the memory 206. The updated file system data is recorded into the recording medium 210 by the recording medium control unit 208. A display control unit 213 displays an image and other information to a display unit 214. The display unit 214 includes a liquid crystal display apparatus, an organic EL apparatus, or the like. An output unit 215 outputs the moving image data which is input or the moving image data which is reproduced to the outside.

Subsequently, processings in the case where the moving image data which is input by the input units 201 to 204 is recorded into the recording medium by the recording apparatus 200 will be described.

By operating the operation unit 212, the user can set the number of pixels and the frame rate of the moving image data which is input from the input units 201 to 204 and the SDI format in the input units 201 to 204. By setting the input units 201 to 204 in accordance with the number of pixels and the frame rate of the moving image data which were set in the output units 115 to 118 of the recording apparatus 100 and the SDI format, the user can input and record the moving image data which is output from the recording apparatus 100.

After a power source of the recording apparatus 200 is turned on, the user connects the output units 115 to 118 of the recording apparatus 100 and the input units 201 to 204 by cables which conform with the SDI format and sets the moving image data which is input from the input units 201 to 204 and the SDI format as mentioned above. When the recording apparatus 100 is set into the external output mode, the moving image data is input into the input units 201 to 204 from the recording apparatus 100.

In this recording standby state, when the user instructs the recording start by operating the operation unit 212, the control unit 211 instructs so that the moving image data which is input from the input units 201 to 204 is recorded into the recording medium 210. At this time, the user can select the moving image data to be recorded in the moving image data which is input from the input units 201 to 204. The user can also instruct to collectively (as one file) record one of the selected moving image data among the moving image data which is input from the input units 201 to 204. That is, as shown in the state 1 of FIG. 9, in the case where the moving image data of 4K is divided into four channels and output, the moving image data of those four channels is input to the input units 201 to 204. By making settings to collect the input units 201 to 204 into one unit to be recorded, the user can record the data as moving image data of 4K and the frame rate of 59.94 fps into the recording medium 210. When the user instructs the recording stop by operating the operation unit 212, the recording of the moving image data into the recording medium 210 is stopped.

As mentioned above, the input control unit 205 detects the recording start command and recording stop command multiplexed to the moving image data which is output from the recording apparatus 100 and transmits to the control unit 211. In accordance with the recording start command data, the control unit 211 starts the recording of the moving image data which is input from the input units 201 to 204. In accordance with the recording stop command data, the control unit 211 stops the recording of the moving image data which is input from the input units 201 to 204. In this case, if information of an output state in the recording apparatus is multiplexed to the received moving image data, such a fact is detected and the input units may be set.

In the embodiment, the moving image data which is recorded for a period of time from the start to the end of the recording is managed as one file. If it is set that the moving image data which is input from the input units 201 to 204 is collectively recorded as one data, the moving image data which is collected into one data is managed as one moving image file.

As mentioned above, in the embodiment, in the case of outputting the moving image data to the external recording apparatus or the like in the external output mode, the editing moving image data is generated into its own recording medium in parallel with the outputting of the moving image data and recorded. Therefore, there is no need to generate the editing moving image data later. In the embodiment, the number of editing moving image data to be generated is determined on the basis of the number of pixels and the frame rate of the moving image data which is output and the number of output channels of the moving image data. Therefore, if a plurality of moving image data is recorded by the external recording apparatus, the editing moving image data of the number corresponding to each moving image data can be generated.

Although the recording apparatus 100 is constructed so as to record the moving image data into the two recording mediums in the embodiment, it is also possible to construct in such a manner that the moving image data can be recorded into three or more recording mediums. The moving image data can be also output in accordance with a format other than the SDI format. Although the moving image data having less number of pixels than that of the moving image data which is output to the outside is recorded as editing moving image data, the moving image data in which an information amount is smaller than that of the moving image data which is output to the outside can be also used as the editing moving image data. Although the apparatus has four output units and the moving image data is output by using the output units of four channels in the embodiment, the number of channels is not limited to 4 and a plurality of channels may be used.

Although the embodiment is described with respect to the example in which the invention is applied to the image pickup apparatus, the invention is not limited to such an example. For instance, the invention may be applied to an information processing apparatus such as a personal computer or the like having an input/output unit, a display unit, and a recording unit or to a recording system in which such an information processing apparatus and an external recording apparatus such as a server or the like are connected.

Each unit constructing the recording apparatus and each step of the control method according to the embodiments of the invention mentioned above can be realized by a method whereby a program stored in a RAM, ROM, or the like of a computer operates. The program and a computer-readable storage medium in which the program is stored are incorporated in the invention.

The invention can be also embodied, for example, as a system, an apparatus, a method, a program, a storage medium, or the like. Specifically speaking, the invention can be applied to a system constructed by a plurality of apparatuses or an apparatus constructed by one equipment.

The invention also incorporates a case where the program of software for realizing the functions of the embodiments mentioned above is supplied to the system or apparatus directly or from a remote place. The invention also incorporates a case where those functions are accomplished by a method whereby a computer of the system or apparatus reads out and executes a program code of the supplied program.

Therefore, the program code itself which is installed into the computer in order to realize the functions and processings of the invention also realizes the invention. That is, the invention also incorporates the computer program itself for realizing the functions and processings of the invention. In such a case, the computer program may have any form such as object code, program which is executed by an interpreter, script data which is supplied to the OS, or the like so long as it has a function of the program.

As storage mediums for supplying the program, for example, there are a flexible disk, a hard disk, an optical disk, a magnetooptic disk, and the like. Further, there are an MO, a CD-ROM, a CD-R, a CD-RW, a magnetic tape, a non-volatile memory card, a ROM, a DVD (DVD-ROM, DVD-R), and the like.

As another program supplying method, there is a method of connecting a client computer to a Homepage of the Internet by using a browser of the client computer. The computer program itself of the invention can be also supplied from the Homepage or the program can be also supplied by downloading a compressed file including an automatic installing function into a storage medium such as a hard disk or the like.

The functions and processings of the invention can be also realized by a method whereby the program code constructing the program of the invention is divided into a plurality of files and those files are downloaded from different Homepages. That is, a WWW server for allowing a plurality of users to download a program file for realizing the functions and processings of the invention by the computer is also incorporated in the invention.

As another method, the functions and processings of the invention can be also realized by a method whereby the program of the invention is encrypted, stored into a storage medium such as a CD-ROM or the like, and distributed to the users, the user who can clear a predetermined condition is allowed to download key information for decrypting the encryption from the Homepage through the Internet, the encrypted program is executed by using the key information, the program is installed into the computer, and those functions are realized.

The functions of the embodiments mentioned above can be realized by a method whereby the computer executes the read-out program. Further, the functions of the embodiments mentioned above can be realized by a method whereby the OS or the like which operates on the computer executes a part or all of actual processings on the basis of instructions of the program, and they are realized by those processings.

As further another method, the functions of the embodiments mentioned above can be realized by a method whereby, first, the program read out of the storage medium is written into a memory provided for a function expanding board inserted in a computer or a function expanding unit connected to the computer, a CPU or the like provided for the function expanding board or the function expanding unit executes a part or all of actual processings on the basis of instructions of the program, and they are realized by those processings.

The foregoing embodiments have merely been shown and described as specific examples for embodying the invention and the technical scope of the invention should not be limitedly interpreted. That is, the invention can be embodied in various forms without departing from a technical idea of the invention or a principal features thereof.

While the present invention is described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-025369 filed on Feb. 8, 2012, which is hereby incorporated by reference herein in its entirety.

What is claimed is:

1. A recording apparatus comprising: an obtaining unit configured to obtain moving image data; a generation unit configured to generate first moving image data and second moving image data having less number of pixels than that of the first moving image data by using the moving image data obtained by the obtaining unit; an outputting unit configured to output the first moving image data generated by the generation unit by using at least one of a plurality of output channels which conform with a predetermined format; a setting unit configured to set a number of pieces of the first moving image data to be output by the outputting unit, wherein the setting unit determines the number of pieces of the first moving image data to be output by the outputting unit on the basis of a number of the output channels to be used for outputting a single piece of the first moving image data, wherein the outputting unit has a first mode for outputting a first number of pieces of the first moving image data and a second mode for outputting a second number of pieces of the first moving image data larger than the first number; a recording unit configured to record the second moving image data generated by the generation unit into a recording medium; and a control unit configured to control the outputting unit and the recording unit so as to record the second moving image data into the recording medium in parallel with the outputting of the first moving image data by the outputting unit, wherein the control unit determines a number of pieces of the second moving image data to be recorded by the recording unit in accordance with the number of pieces of the first moving image data to be output by the outputting unit and controls the recording unit to record the determined number of pieces of the second moving image data in parallel with outputting of the first moving image data by the outputting unit.

2. An apparatus according to claim 1, wherein the outputting unit outputs the second moving image data in parallel with the first moving image data, and
wherein the control unit determines the number of pieces of the second moving image data to be recorded by the recording unit in accordance with the number of pieces of the first moving image data to be output by the outputting unit and the number of pieces of the second moving image data to be output by the outputting unit in parallel with the first moving image data.

3. An apparatus according to claim 1, wherein the outputting unit multiplexes a predetermined command to the first moving image data.

4. An apparatus according to claim 1, wherein the outputting unit multiplexes information of the output state of the first moving image data to the first moving image data.

5. A recording system for recording moving image data, comprising: a first recording apparatus including: an obtaining unit configured to obtain moving image data; a generation unit configured to generate first moving image data and second moving image data having less number of pixels than that of the first moving image data by using the moving image data obtained by the obtaining unit; an outputting unit configured to output the first moving image data generated by the generation unit by using at least one of a plurality of output channels which conform with a predetermined format; a setting unit configured to set a number of pieces of the first moving image data to be output by the outputting unit, wherein the setting unit determines the number of pieces of the first moving image data to be output by the outputting unit on the basis of a number of the output channels to be used for outputting a single piece of the first moving image data, wherein the outputting unit has a first mode for outputting a first number of pieces of the first moving image data and a second mode for outputting a second number of pieces of the first moving image data larger than the first number; a recording unit configured to record the second moving image data generated by the generation unit into a recording medium; and a control unit configured to control the outputting unit and the recording unit so as to record the second moving image data into the recording medium in parallel with the outputting of the first moving image data by the outputting unit, wherein the control unit determines a number of pieces of the second moving image data to be recorded by the recording unit in accordance with the number of pieces of the first moving image data to be output by the outputting unit and controls the recording unit to record the determined number of pieces of the second moving image data in parallel with outputting of the first moving image data by the outputting unit, the recording system further comprising: a second recording apparatus which is connected to the first recording apparatus and records the first moving image data which is output from the first recording apparatus, wherein the second recording apparatus has an input unit configured to input the first moving image data which is output from the outputting unit by using at least one of a plurality of input channels corresponding to the plurality of output channels which conform with the predetermined format, a second recording unit configured to record the first moving image data which is input by the input unit into a second recording medium, and a second control unit configured to control to record the first moving image data by the second recording unit, in accordance with a command multiplexed to the first moving image data input by the input unit.

6. A system according to claim 5, wherein the second control unit controls the second recording unit so as to record the first moving image data as one moving image file.

7. A control method of a recording apparatus for recording moving image data, comprising the steps of: obtaining the moving image data; generating first moving image data and second moving image data having less number of pixels than that of the first moving image data by using the obtained moving image data; outputting the first moving image data generated in the generation step by using at least one of a plurality of output channels which conform with a predetermined format; setting a number of pieces of the first moving image data to be output in the outputting step, wherein in the setting step, the number of pieces of the first moving image data to be output in the outputting step is determined on the basis of a number of the output channels to be used for outputting a single piece of the moving image data, wherein, in the outputting step, there are a first mode for outputting a first number of pieces of the first moving image data and a second mode for outputting a second number of pieces of the first moving image data larger than the first number; recording the second moving image data generated in the generating step into a recording medium; and controlling the outputting step and the recording step so as to record the second moving image data into the recording medium in parallel with the outputting of the first moving image data in the outputting step, wherein the control step determines a number of pieces of the second moving image data to be recorded in the recording step in accordance with the number of pieces of the first moving image data to be output in the outputting step and controls the recording step to record the determined number of pieces of the second moving image data in parallel with outputting of the first moving image data in the outputting step.

8. A recording apparatus comprising:
an obtaining unit configured to obtain moving image data;
a generation unit configured to generate first moving image data and second moving image data having less number of pixels than that of the first moving image data by using the moving image data obtained by the obtaining unit;
an outputting unit configured to output the first moving image data and the second moving image data generated by the generation unit in parallel by using a plurality of output channels which conform with a predetermined format,
wherein a number of pieces of the first moving image data to be output by the outputting unit is determined in accordance with a number of the output channels to be used by the outputting unit for outputting a single piece of the first moving image data, and a number of pieces of the second moving image data to be output by the outputting unit is determined in accordance with a number of the output channels to be used by the outputting unit for outputting a single piece of the second moving image data;
a recording unit configured to record the second moving image data generated by the generation unit into a recording medium; and
a control unit configured to control the outputting unit and the recording unit so as to record the second moving image data into the recording medium in parallel with the outputting of the first moving image data by the outputting unit,
wherein the control unit determines a number of pieces of the second moving image data to be recorded by the recording unit in accordance with the number of pieces of the first moving image data to be output by the outputting unit and the number of pieces of the second moving image data to be output by the outputting unit, and controls the recording unit to record the determined number of pieces of the second moving image data in parallel with outputting of the first moving image data and the second moving image data by the outputting unit.

* * * * *